United States Patent [19]

Collins et al.

[11] Patent Number: 4,915,482

[45] Date of Patent: Apr. 10, 1990

[54] OPTICAL MODULATOR

[75] Inventors: Reuben T. Collins, Yorktown Heights; John R. Kirtley, Katonah; Thomas N. Theis, Croton-on-Hudson, all of N.Y.

[73] Assignee: International Business Machines Corporation, Armonk, N.Y.

[21] Appl. No.: 263,743

[22] Filed: Oct. 27, 1988

[51] Int. Cl.$^4$ .............................................. G02F 1/015
[52] U.S. Cl. ................................. 350/355; 350/356
[58] Field of Search ................ 350/353, 355, 356; 357/4, 16

[56] References Cited

U.S. PATENT DOCUMENTS

| | | | |
|---|---|---|---|
| 4,025,939 | 5/1977 | Aiki et al. ............................ | 357/331 |
| 4,057,321 | 11/1977 | Mahlein et al. .................. | 350/356 X |
| 4,093,345 | 6/1978 | Logan ................................. | 350/355 |
| 4,218,143 | 8/1980 | Bottka ................................ | 356/250 |
| 4,525,687 | 6/1985 | Chemla et al. ..................... | 332/357 |
| 4,620,214 | 10/1986 | Margalit et al. ..................... | 357/63 |

FOREIGN PATENT DOCUMENTS 0249645 12/1987 European Pat. Off. .

OTHER PUBLICATIONS

"Stark Shifts in GaAs/GaAlAs Quantum Wells Studies by Photoluminescence Spectroscopy", Vina et al., IBM Research Report RC 11795 (#52968), 3/25/86.
"Physics and Applications of Quantum Wells in Waveguides", J. S. Weiner, SPIE, vol. 578, Integrated Optical Circuit Engineering II (1985), pp. 116–121.
D. S. Chemla, "Quantum Wells for Photonics", Physics Today, May 1985, pp. 57–64.
D. A. B. Miller et al., "Electric Field Dependence of Optical Absorption Near the Band Gap of Quantum-Well Structures", Physical Review, vol. 32, No. 2, Jul. 15, 1985, pp. 1043–1060.
K. Wakita et al., "Long—Wavelength Optical Modulation in Multiple Quantum Wells", Surface Science, 174 (1986), pp. 233–237.
J. S. Weiner et al., "Strong Polarization–Sensitive Electroabsorption in GaAs/AlGaAs Quantum Well Waveguides", Applied Physics, vol. 47, No. 11, Dec. 1, 1985, pp. 1148–1150.
R. W. Keyes, "Electrophotographic Light Amplifier", IBM Technical Disclosure Bulletin, vol. 8, No. 11, Apr. 1966, pp. 1557–1559.
Y. Arkawa et al., "Active Q Switching in a GaAs/AlGaAs Multiquantum Well Laser with an Intracavity Monolithic Loss Modulator", Applied Physics Letter, vol. 48, No. 9, Mar. 3, 1986, pp. 561–563.
D. L. Mills et al., "The Electromagnetic Modes of Media", Rep. Prog. Phys., 37, 817 (1974).
B. Laks et al., "Photon Emission from Slightly Roughened Tunnel Junctions", Physical Review, vol. 20, No. 12, Dec. 15, 1979, pp. 4962–4980.
Kirtley. et al., "Diffraction–Grating–Enhanced Light Emission from Tunnel Junctions", Applied Physics Letter, vol. 37, No. 5, Sep. 1, 1980, pp. 435–437.
D. Hulin et al., "Ultrafast All—Optical Gate with Subpicosecond ON and OFF Response Time", Applied Physics Letter, 49 (13), Sep. 29, 1986, pp. 749–751.

*Primary Examiner*—Eugene R. LaRoche
*Assistant Examiner*—Nathan W. McCutcheon
*Attorney, Agent, or Firm*—Jeffrey L. Brandt

[57] ABSTRACT

A method of modulating light incident to a semiconductor body comprising the steps of: coupling the incident light to the surface plasmon polariton mode at an interface of the semiconductor body; and selectively altering the absorption of the incident light by the semiconductor body so as to decouple the incident light from the surface plasmon polariton mode. The absorption can be selectively altered by establishing a quantum confined optical absorption region within the semiconductor body, and effecting a Stark shift of the quantum confined optical absorption region.

18 Claims, 2 Drawing Sheets

OPTICAL MODULATOR

CROSS-REFERENCE TO RELATED APPLICATIONS

The subject application is related to pending U.S. patent application Ser. No. 21,959, filed 5 Mar. 1987, and assigned to the same assignee as the present application.

FIELD OF THE INVENTION

The present invention relates generally to electro-optic devices and more specifically to electro-optic modulators.

BACKGROUND OF THE INVENTION

A quantum-well structure operated in accordance with the quantum confined Stark effect near the edge of its absorptive band exhibits the largest optical nonlinearity measured to date in any semiconductor at room temperature. This characteristic makes such quantum-well structures of particular interest in the fabrication of a variety of electro-optic devices, including, for example, optical modulators, photodetectors, optical switches, and the like. For a general discussion of quantum-well electro-optic devices, the reader is directed to the article: "Quantum Wells For Photonics", by D. S. Chemla, Physics Today, May, 1985, pgs, 57–64. For a more thorough discussion of the quantum confined stark effect, the reader is directed to the article: "Electric Field Dependence of Optical Absorption Near the Band Gap of Quantum-Well Structures", by D. A. B. Miller, et al., Physical Review, Vol. 32, No. 2, 15 July 1985, pgs 1043–1060.

For a discussion of the use of quantum-well devices to modulate long wavelength light, the reader is directed to the article "Long-Wavelength Optical Modulation in Multiple Quantum Wells", by K. Wakita et al., Surface Science 174 (1986), pgs 233–237.

Quantum-well electro-optic devices are used today in two general modes. A first mode is that wherein incident light is directed generally parallel to the plane of the multiple layer heterostructure, i.e. the "edge-on" mode. For a discussion of such quantum-well devices, the reader is directed to the article: "Strong Polarization-Sensitive Electroabsorption in GaAs/AlGaAs Quantum Well Waveguides", by J. S. Weiner, et al., Applied Physics Letter, Vol. 47, No. 11, 1 Dec. 1985, pgs. 1148–1150. A second mode is that wherein the incident light is directed generally perpendicular to the plane of the heterostructure.

U.S. Pat. No. 4,525,687 to Chemla et al. provides a complete discussion of quantum well devices, including devices operated edge on, and devices operated with perpendicular incident light. Chemla et al. shows devices operated with electrical fields both parallel and perpendicular to the planes of the devices. Chemla et al. further discusses the use of such devices as optical absorption modulators, optical phase modulators, electrically tuned Fabry-Perot cavities, polarization modulators, and switches.

U.S. Pat. No. 4,620,214 to Margalit et al. shows a device including an infrared detector comprising multiple, alternating layers of GaAs and $Ga_{1-x}Al_xAs$. The structure shown in Margalit et al. is an "edge on" detector, wherein light is directed incident to the edges of the heterostructure.

Published European Patent Application EPA No. 0 249 645, assigned to the assignee of the present invention, shows an optoelectronic voltage-controlled modulator including a quantum well structure functioning as an optical absorber, and a superlattice functioning as a buried reflector, both formed on a GaAs substrate. A light beam is applied relatively normal to the heterolayer device so as to reflect through the quantum well structure from the buried reflector. A control voltage is applied across the device to determine the degree of absorption effected by the optical absorber, and hence to modulate the reflected light.

U.S. Pat. No. 4,218,143 to Bottka shows a semiconductor device incorporating multilayer, mismatched lattice structures used to measure the wavelength of incident light. The Bottka device includes a structure incorporating multiple layers of $GaAs_{1-x}Sb_x$. Incident monochromatic light is reflected through the semiconductor device off of a Schottky barrier contact. A modulated electric field is applied to effect modulation of, and hence aid in detecting, light absorbed at the energy gap(s) in the lattice structure. In Bottka, the incident light is directed generally normal to the multilayer structure.

IBM Technical Disclosure Bulletin, Vol. 8, No. 11, April 1966, pgs. 1557–1559, "Electrophotographic Light Amplifier", shows a light amplifier comprising a multilayer structure including adjoining layers of photoconductive material and Stark modulator material.

"Active Q Switching in a GaAs/AlGaAs Multiquantum Well Laser with an Intracavity Monolithic Loss Modulator", by Y. Arkawa et al., Applied Physics Letter, Vol. 48, No. 9, 3 Mar. 1986, pgs 561–563, shows a multiquantum laser including a modulator section exhibiting the quantum confined Stark effect.

When devices employing multiple quantum well heterostructures of the type described above are used to modulate incident light, several disadvantages become apparent. More specifically, devices of the type designed to modulate normally (perpendicular) incident light require a substantial number of quantum wells in order to effect an acceptably high absorption of the incident light. This is true even in reflective devices, such as that shown in EPA No. 0 249 645, wherein the absorptive layer is traversed twice: once by the incident light and once by the reflected light.

In such devices, it is thus required to grow the heterostructure to a substantial thickness, i.e. to incorporate many quantum wells into the heterostructure. The resultantly thick device requires an undesirably large electrical field to effect a Stark shift, requiring the use of an undesirably high electrical potential to bias the device.

In devices designed to modulate parallel incident light, i.e. edge on devices, the wavelength of the light is typically much longer than the thickness of the quantum well. It is thus required to grow an undesirably thick heterostructure (as described above), or to go to substantial efforts to couple the incident light into a thin heterostructure. Such efforts can include, for example, the formation of optical waveguides on the surfaces of the heterostructure.

It is known in the art that a localized electromagnetic field can be established by launching a surface polariton at a semiconductor interface with a discontinuity from a positive to a negative dielectric constant. This process can be used to concentrate a light source incident to the interface into a region with a locally high energy density. For a further discussion of this phenomenon, the reader is directed to the article: "The Electromagnetic Modes of Media", by D. L. Mills, et al. Rep. Prog. Phys. 37, 817 (1974). Along the same lines, the reader is further directed to the article: "Photon Emission From Slightly Roughened Tunnel Junctions", by B. Laks et al., Physical Review, Vol. 20, Number 12, 15 Dec. 1979, pgs. 4962-4980. For a discussion of the same phenomenon with the use of gratings, the reader is directed to the article: "Diffraction-Grating-Enhanced Light Emission From Tunnel Junctions", by Kirtley et al., Applied Physics Letter, Vol. 37, Number 5, 1 Sept. 1980, pgs. 435-437.

U.S. Pat. No. 4,025,939 to Aiki et al. shows a semiconductor laser device employing a quantum well structure with the laser active region comprising the narrow bandgap region. A periodically corrugated surface is employed at the boundary of an optical confinement region to diffract the light and hence control the lasing frequency. Because the corrugated surface in Aiki et al. does not provide the necessary discontinuity in the dielectric constants, no surface polaritons are launched.

2. Summary of the Invention

The principal object of the present invention is to provide a new and improved method and apparatus for modulating light energy.

Another object of the present invention is to provide such a method and apparatus which effects a large change in the intensity of normally incident light using a thin electro-optical structure.

A further object of the present invention is to provide such a method and apparatus which does not require the high electrical voltages or complex incident light coupling of the prior art.

In accordance with the present invention, a new and improved method of modulating light incident to a semiconductor body is provided, comprising the steps of: coupling the incident light to the surface plasmon polariton mode at an interface of the semiconductor body; and selectively altering the absorption of the incident light by the semiconductor body so as to decouple the incident light from the surface plasmon polariton mode.

In one embodiment of the invention, the step of altering the absorption of the incident light includes the steps of: establishing a quantum confined optical absorption region within the semiconductor body; and effecting a Stark shift of the quantum confined optical absorption region.

Further in accordance with the present invention, apparatus is provided for modulating light incident to a semiconductor body, comprising: means for coupling the incident light to the surface plasmon polariton mode at an interface of the semiconductor body; and, means for selectively altering the absorption of the incident light by the semiconductor body so as to decouple the incident light from the surface plasmon polariton mode.

In one embodiment of the invention, the means for altering the absorption of the incident light includes: means for establishing a quantum confined optical absorption region within the semiconductor body; and means for effecting a Stark shift of the quantum confined optical absorption region.

BRIEF DESCRIPTION OF THE DRAWINGS

The foregoing and other objects, features, and advantages of the present invention will be apparent from the following more detailed description of the invention as illustrated by the accompanying drawing figures, in which.

DETAILED DESCRIPTION OF THE INVENTION

Figure 1:
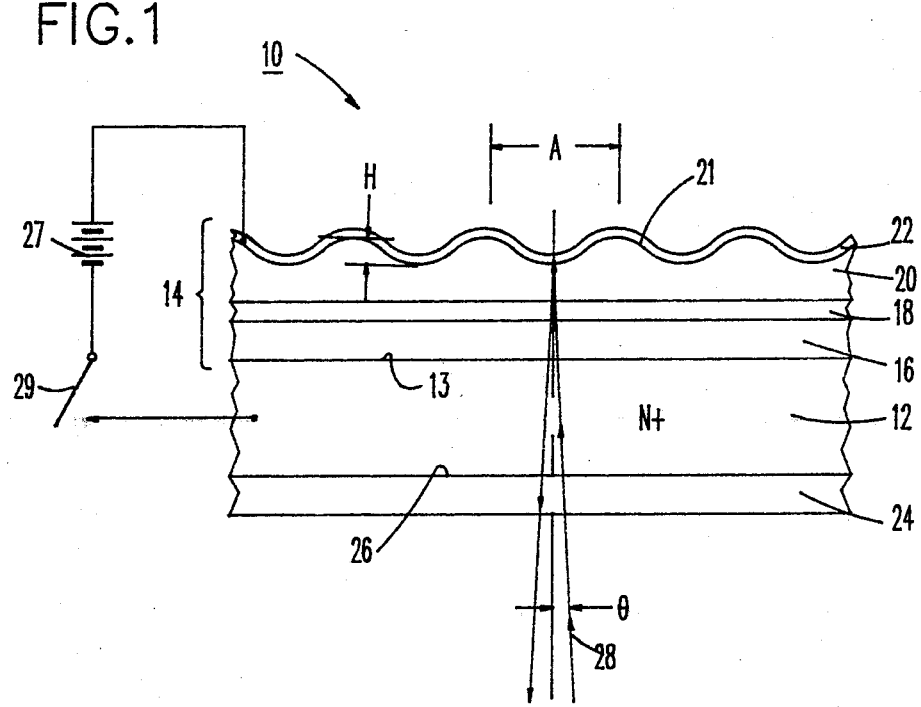
FIG. 1 shows an optical modulator constructed in accordance with the present invention.

Referring now to FIG. 1, an optical modulator 10 constructed in accordance with the present invention includes a substrate 12 of N+ doped GaAs. Overlying a major surface 13 of substrate 12 is a heterolayer quantum confined optical absorption region 14 including an epitaxial layer 16 of $Al_xGa_{1-x}As$, an epitaxial layer 18 of GaAs, and an epitaxial layer 20 of $Al_xGa_{1-x}As$. Layer 20 is formed using one of many known techniques to provide a grated surface 21, shown in the present embodiment as a sinusoidal configuration of periodicity A and amplitude H.

It will be understood that quantum well structure 14 can comprise a sandwich of any appropriate semiconductor materials wherein selective doping can be used to effect the bandgap characteristics described below. Class II-VI and class III-V semiconductor materials, for example, are appropriate. Substrate 12 can alternatively comprise $Al_xGa_{1-x}As$, or an etched window, to extend the frequency of operation of device 10. Further, surface 21 of layer 20 can comprise any grating configuration including, for example, a triangular grating.

A coating 22 of reflective, negative dielectric material, for example a low loss metal such as Ag, Cu, or Au, is formed over grated surface 21 of layer 20. In the illustrated embodiment, layer 22 is selected to be Ag. An antireflective coating 24, comprising, for example $MgF_2$, is formed over a major surface 26 of substrate 12 opposite major surface 13. Means such as a battery 27 and switch 29 are connected between layers 12 and coating 22 for selectively establishing an electrical field normal to the planes of layers 16, 18, 20 in quantum well structure 14. A monochromatic beam of light 28 is shown incident to optical modulator 10 at an angle $\theta$ to the normal of the device major surfaces. Light beam 28 is selected, in a manner described in further detail below, to have an energy smaller than the bandgap of quantum well structure 14.

Figure 2:
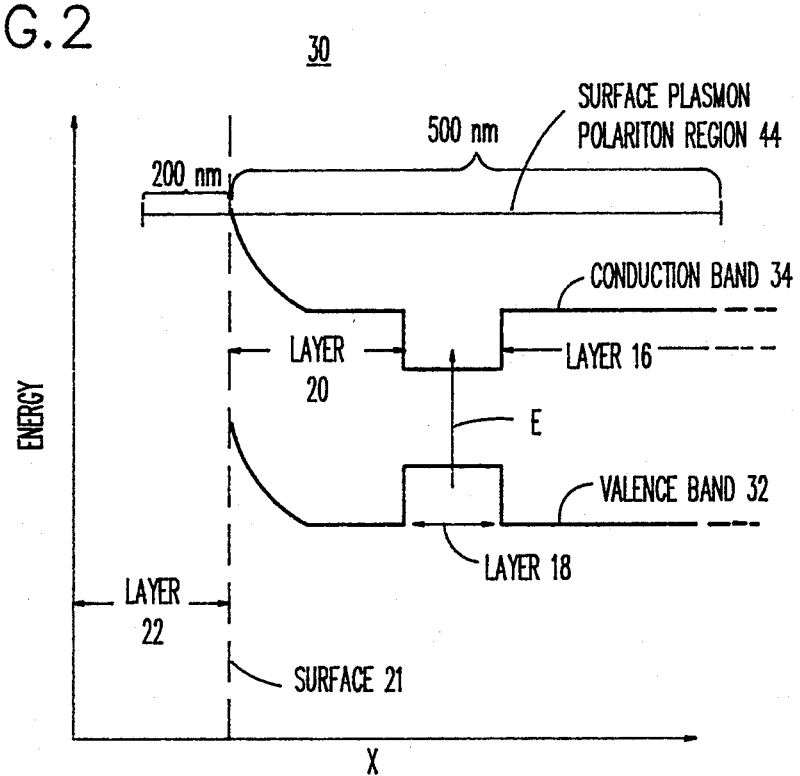
FIG. 2 is a graph depicting the quantum well and electromagnetic field effects within the optical modulator of FIG. 1.

Referring now to FIG. 2, a graph 30 includes an ordinate axis representative of energy and an abscissa representative of a distance X measured normally into the plane of optical modulator 24. In a manner well known to those skilled in the art, quantum well structure 14 establishes the valence and conduction band characteristics, i.e. the bandgap characteristics, shown in graph 30 by plots 32, 34, respectively. In a manner also well known to those skilled in the art, the thicknesses of layers 16, 18 and 20, and the "x" value of layers 16 and 20, are chosen to provide a desired optical transition energy E between the quantum confined levels within the quantum "well". It will be appreciated that, due to the band bending exhibited at the interface between layers 20 and 22, a miniscule electrical field is inherently established in quantum well structure 14. This field is very small with respect to that established through the use of voltage source 27 and switch 29 in the manner described below.

In accordance with the present invention, the characteristics of quantum well structure 14 and grated surface 21 are selected such that monochromatic light beam 28 is coupled into the interface surface plasmon polariton mode of the grated surface at the absorption wavelength of the quantum well. This is accomplished by phase matching incident light beam 28 with a surface plasmon at the absorptive wavelength of quantum well 14 by means of grated surface 21. In accordance wtih recognized principles of physics, this phase matching is accomplished pursuant to Equation (1), below.

$$(n\omega/c) \sin \theta = k_{sp} \pm (2\pi n/A) \quad \text{Eq. (1)}$$

where:

$\omega/c$ = the wavenumber of monochromatic light beam 28;

$k_{sp}$ = the wavenumber of the launched surface plasmon;

A = the periodicity of grated surface 21;

n = an integer; and $\theta$ = the angle of incidence of light beam 28 to the normal of optical modulator 10.

Figure 3:
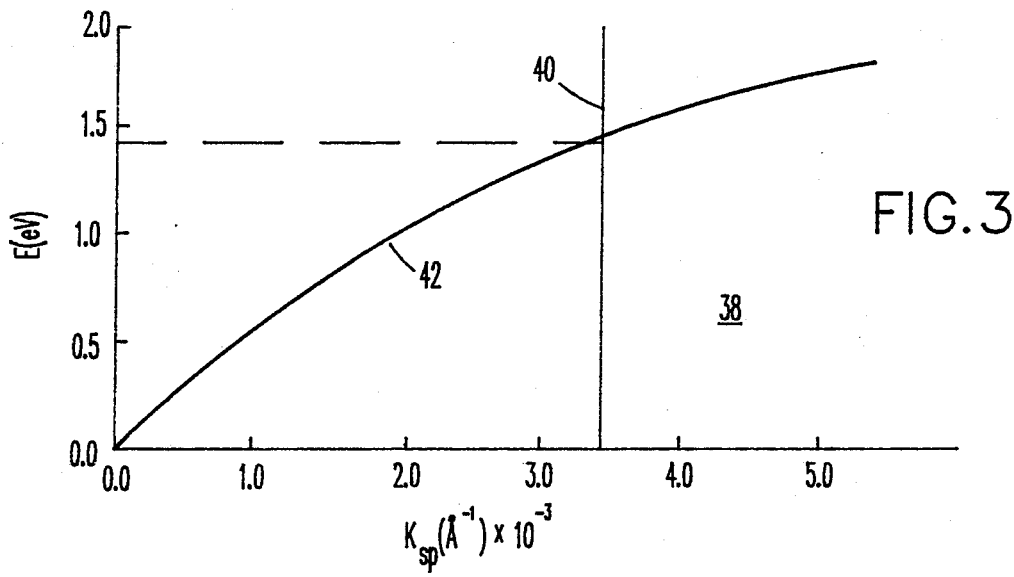
FIG. 3 is a graph depicting the wavelength of surface plasmon polaritons relative to energy.

Referring now to FIG. 3, a graph 38 illustrates the first order (i.e. n=1) condition for phase matching of light beam 28 to the surface plasmon polariton mode at the interface 21 of layer 20 with coating 22 (Eq. 1). The ordinate axis of graph 38 represents energy E in electron-volts, while the abscissa represents wavenumber. A plot 40 illustrates the wavevector of light 28 parallel to the surface at normal incidence, plus a grating periodicity $2\pi/A$ (i.e. $(n\omega/c)\sin \theta + 2\pi/A$). A plot 42 illustrates the theoretical wave vector (i.e. $K_{sp}$) of surface plasmons at the interface of surface 21 and coating 22.

For purposes of describing an exemplary embodiment of the present invention, the thicknesses, built in electrical field, and "x" values of layers 16, 18, and 20 are selected to provide a minimum optical transition energy E of 1.4 electron-volts (eV). Monochromatic light beam 28 is thus selected to be 1.4 eV, or to have a wavelength of 8300 angstroms. Subsequent to the selection of the energy level for light beam 28, Equation (1) is used to select the periodicity A of grated surface 21, and the angle $\theta$ of the incident light beam. In the illustrated embodiment of the invention, angle $\theta$ is selected to be 0°. Grated surface 21 is calculated to have a periodicity A of 200 nm. Amplitude H of grated surface 21 is selected to be 5 nm, i.e. sufficient to provide good coupling to the surface plasmons, while not overly large so as to damp them out.

Referring back to FIG. 2, when the variables for light beam 28, quantum well structure 14, and grated surface 21 are selected in the manner described above, the light beam is phase matched to couple into the surface plasmon polariton mode, enhancing the photon field in the region close to metal layer 22. The decay length of the photon fields away from the interface at surface 21 are calculated to be about 500 nm into layer 20 and 200 nm into coating 22. Because a single quantum well structure of the type shown at 14 in FIG. 1 can be fabricated with a thickness of well under 500nm, the structure is positioned within the enhanced photon field as is shown schematically at 44 in FIG. 2.

Figure 4:
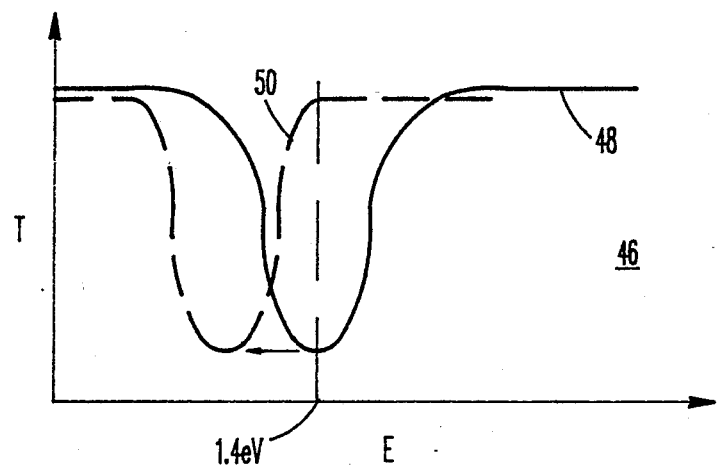
FIG. 4 is a graph depicting exemplary absorptive characteristics for the quantum well structure 14 of FIG. 1.

Referring now to FIG. 4, a graph 46 is shown illustrating the transmissivity T of quantum well structure 14 on the ordinate axis, versus energy E on the abscissa. The 1.4 eV energy of light beam 28 is indicated in dashed line. A first plot 48 indicates the transmissivity of quantum well structure 14 when no external voltage is applied. In a manner characteristic of the quantum well structures described above, structure 14 has a steep, narrow absorption range, yielding a minimum transmissivity at the selected 1.4 eV energy level. However, when a voltage is applied across quantum well structure 14 with battery 27 and switch 29, a Stark shift is effected so as to shift the absorptive energy level away from the 1.4 eV level. This Stark shift is indicated in dashed-line as plot 50. Quantum well structure 14 thus exhibits a substantially higher transmissivity at the same 1.4 eV energy level. It will be understood that graph 46 is not intended to illustrate actual measured or calculated values for the transmissivity of quantum well structure 14, but rather is schematic in nature to indicate the general affect of a Stark shift in optical modulator 10 as described above. The actual effect of a single quantum well structure of the type shown at 14 in FIG. 1 is very small.

Figure 5:
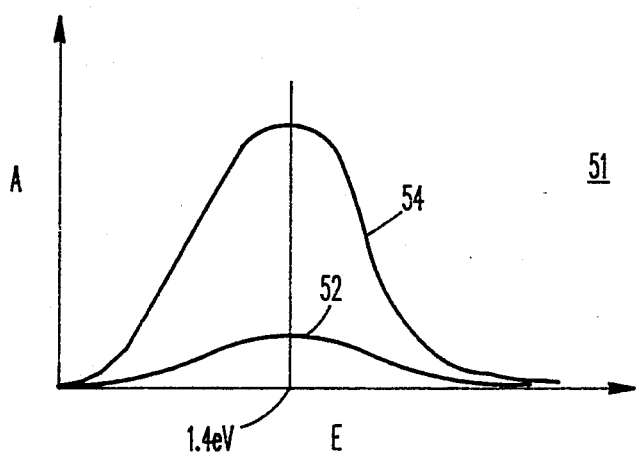
FIG. 5 is a graph depicting the absorptive characteristics of optical modulator 10 of FIG. 1.

Referring now to FIG. 5, a graph 51 is shown having an ordinate axis representative of the (absorbed power)/(incident power) ratio A of a light beam incident on optical modulator 10, and an abscissa representative of energy E. The 1.4 eV energy selected for light beam 28 is indicated in dashed-line.

In operation, when a Stark shift is effected across quantum well structure 14, shifting the absorption of the structure away from the 1.4 eV level of light beam 28 as shown by plot 50 of FIG. 4, substantial absorption of incident light beam 28 is achieved through the coupling of the beam into the surface plasmon polariton mode at surface 21. This absorption into the surface plasmon polariton mode is theoretically calculated at close to 100% for a sufficiently large grating amplitude H. Plot 54 of graph 51 shows the relatively large absorption achieved by device 10 when a Stark shift is effected across quantum well structure 14.

When the Stark shift effect due to applied voltage 27 is removed from quantum well structure 14, shifting the absorption of the structure onto the 1.4 eV energy level of light beam 28 as shown by plot 48 of FIG. 4, a small percentage of the incident and reflected energies of the light beam are absorbed by the quantum well structure. Because only a single quantum well structure 14 is utilized, this absorption has been calculated to be about 14% of that exhibited when the quantum confined optical absorption is Stark shifted away from the 1.4 eV energy of incident light 28.

However, while the absorption effected by quantum well structure 14 is minimal, the present inventors have discovered that it is sufficient, to decouple incident light beam 28 from the surface plasmon polariton mode. This decoupling eliminates the proportionally greater absorptive effects of the surface plasmon polariton mode, and substantially decreases the absorption of incident light beam 28 by device 10. This decrease in the absorption of light beam 28 by device 10 is illustrated by plot 52 of FIG. 5.

Summarizing the operation of the present invention, the present inventors have discovered that by concentrating an incident light source into a semiconductor region with a locally high electromagnetic field strength, a small change in the absorptive characteristics of the semiconductor region provide an unexpectedly large electro-optical effect. In the described embodiment, the region of high electromagnetic field strength is provided by coupling incident light beam 28 into the surface plasmon polariton mode at the interface of layer 20 and coating 22. Because the decay lengths of the polariton fields away from the interface at 21 are about 500 nm into layer 20 and 200 nm into coating 22, even a single quantum well structure of 75-120 angstroms in thickness can be used to effect the above-described large modulation in reflected energy.

Because a single, or very thin, quantum well structure can be utilized to effect a large modulation, the present invention has the advantages of providing: shorter device growth times, intrinsically smaller devices, smaller electrical field and bias potential requirements, and resultantly greater device operating speeds in comparison to the prior art devices described above. Further, optical modulator 10 operates with normally incident, versus parallel incident light. This characteristic is believed to be more compatible with discrete device technologies.

While the present invention has obvious applications as a light amplitude modulator when operated as described above, it can also be used as a polarization modulator. More particularly, when the absorption characteristics of quantum well structure 14 are tuned away from the energy level of incident light beam 28, p-polarized light is strongly absorbed, and s-polarized light is reflected. When the absorption characteristics are tuned to the energy level of the incident light, p-polarized light is reflected, and s-polarized light is weakly absorbed.

There is thus provided a new and improved method and apparatus for providing an electro-optical device having improved operational characteristics in comparison to prior art devices. The device has particular application as a light amplitude modulator, and may further be operated as a light polarity modulator. The device can be fabricated using conventional semiconductor fabrication techniques.

While the present invention has been shown and described with respect to a specific embodiment, it will be understood that the invention is not so limited. Numerous modifications, variations, and improvements will become apparent to those skilled in the art without departing from the spirit and scope of the present invention.

What is claimed is:

1. A method of modulating light incident to a semiconductor body comprising the steps of:
    coupling said incident light to the surface plasmon polariton mode at an interface of said semiconductor body; and
    selectively altering the absorption of said incident light by said semiconductor body so as to decouple said incident light from the surface plasmon polariton mode.

2. A method in accordance with claim 1 wherein said step of altering the absorption of said incident light includes the steps of:
    establishing a quantum confined optical absorption region within said semiconductor body; and
    effecting a Stark shift of said quantum confined optical absorption region.

3. A method in accordance with claim 2 and further including the step of reflecting said incident light from said interface of said semiconductor body, whereby said step of effecting a Stark shift alters the intensity of the reflected light.

4. A method in accordance with claim 2 wherein said step of establishing a quantum confined optical absorption region includes providing at least one quantum well structure within said semiconductor device.

5. A method in accordance with claim 2 wherein said step of effecting a Stark shift includes establishing an electrical field across said semiconductor body.

6. A method in accordance with claim 4 wherein said step of establishing said quantum well structure includes the step of providing a first band gap semiconductor material sandwiched between a second band gap semiconductor material.

7. A method in accordance with claim 2 wherein said coupling step comprises the steps of:
    providing a periodic grating of a negative dielectric constant material at said interface; and
    phase matching the incident light to the surface plasmon using the periodically grated interface.

8. Apparatus for modulating light incident to a semiconductor body comprising:
    means for coupling said incident light to the surface plasmon polariton mode at an interface of said semiconductor body; and
    means for selectively altering the absorption of said incident light by said semiconductor body so as to decouple said incident light from the surface plasmon polariton mode.

9. Apparatus in accordance with claim 8 wherein said means for altering the absorption of said incident light includes:
    means for establishing a quantum confined optical absorption region within said semiconductor body; and
    means for effecting a Stark shift of said quantum confined optical absorption region.

10. Apparatus in accordance with claim 9 and further including means for reflecting said incident light from said interface of said semiconductor body, whereby said means for effecting a Stark shift alters the intensity of the reflected light.

11. Apparatus in accordance with claim 9 wherein said means for establishing a quantum confined optical absorption region includes at least one quantum well structure within said semiconductor device.

12. Apparatus in accordance with claim 9 wherein said means for effecting a Stark shift includes means for establishing an electrical field across said semiconductor body.

13. Apparatus in accordance with claim 11 wherein said means for establishing said quantum confined optical absorption region includes a first band gap semiconductor material sandwiched between a second band gap semiconductor material.

14. Apparatus in accordance with claim 9 wherein said coupling means includes a periodic grating of a negative dielectric constant material at said interface.

15. Apparatus in accordance with claim 9 and further including an antireflective coating disposed over the surface of said semiconductor device.

16. An optical modulator comprising:
    a semiconductor body having a positive dielectric constant and a periodically grated surface;

a layer of negative dielectric metal coating said periodically grated surface;

at least one quantum well including a first bandgap material sandwiched between a second bandgap material in said semiconductor body proximate and generally parallel to said periodically grated surface;

means for applying an electrical field across said semiconductor body, and means for generating a beam of light incident to said semiconductor body such that said beam of light is phase matched to the surface plasmon using said periodically grated surface.

17. An optical modulator in accordance with claim 16 and further including an antireflective coating on the surface of said semiconductor body.

18. An optical modulator in accordance with claim 16 wherein said first bandgap material comprises GaAs and said second bandgap material comprises $Al_xGa_{1-x}As$.

* * * * *